United States Patent
Yang et al.

(10) Patent No.: US 9,686,793 B2
(45) Date of Patent: Jun. 20, 2017

(54) NETWORK SHARING SCHEME FOR MACHINE-TO-MACHINE (M2M) NETWORK

(71) Applicant: Verizon Patent and Licensing Inc., Arlington, VA (US)

(72) Inventors: Jin Yang, Orinda, CA (US); Lei Song, Fremont, CA (US); Arda Aksu, Martinez, CA (US); William H. Stone, Doylestown, PA (US); Matthew W. Nelson, Pleasanton, CA (US); Sanyogita Shamsunder, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 126 days.

(21) Appl. No.: 14/702,088

(22) Filed: May 1, 2015

(65) Prior Publication Data

US 2016/0323882 A1 Nov. 3, 2016

(51) Int. Cl.
*H04W 72/04* (2009.01)
*H04W 4/00* (2009.01)

(52) U.S. Cl.
CPC ....... *H04W 72/0453* (2013.01); *H04W 4/005* (2013.01); *H04W 72/04* (2013.01)

(58) Field of Classification Search
CPC .............................................. H04W 72/0453
See application file for complete search history.

(56) References Cited

U.S. PATENT DOCUMENTS

| | | | | |
|---|---|---|---|---|
| 2013/0094457 A1* | 4/2013 | Seo | ............. | H04W 72/042 370/329 |
| 2014/0328303 A1* | 11/2014 | Jamadagni | ............. | H04W 4/005 370/329 |
| 2014/0341141 A1* | 11/2014 | Nguyen | ............. | H04W 16/14 370/329 |
| 2015/0181575 A1* | 6/2015 | Ng | ............. | H04L 5/0092 370/329 |
| 2015/0188684 A1* | 7/2015 | Takeda | ............. | H04W 72/04 370/329 |

\* cited by examiner

*Primary Examiner* — Brian D Nguyen
*Assistant Examiner* — Toan Nguyen

(57) ABSTRACT

A base station includes an antenna to receive frequency bands that include a first band associated with first signals carrying machine-two-machine (M2M) data and a second band associated with second signals carrying user equipment (UE) data. The base station further includes a baseband unit (BBU) that includes: a radio frequency (RF) interface configured to receive the first signals and the second signals, a digital front end (DFE) configured to generate first symbols based on the first signals and second symbols based on the second signals, a symbol processor configured to convert the first symbols into the M2M data and the second symbols into the UE data, and one or more processors configured to forward the M2M data to a first device and the UE data to a second device that differs from the first device.

18 Claims, 12 Drawing Sheets

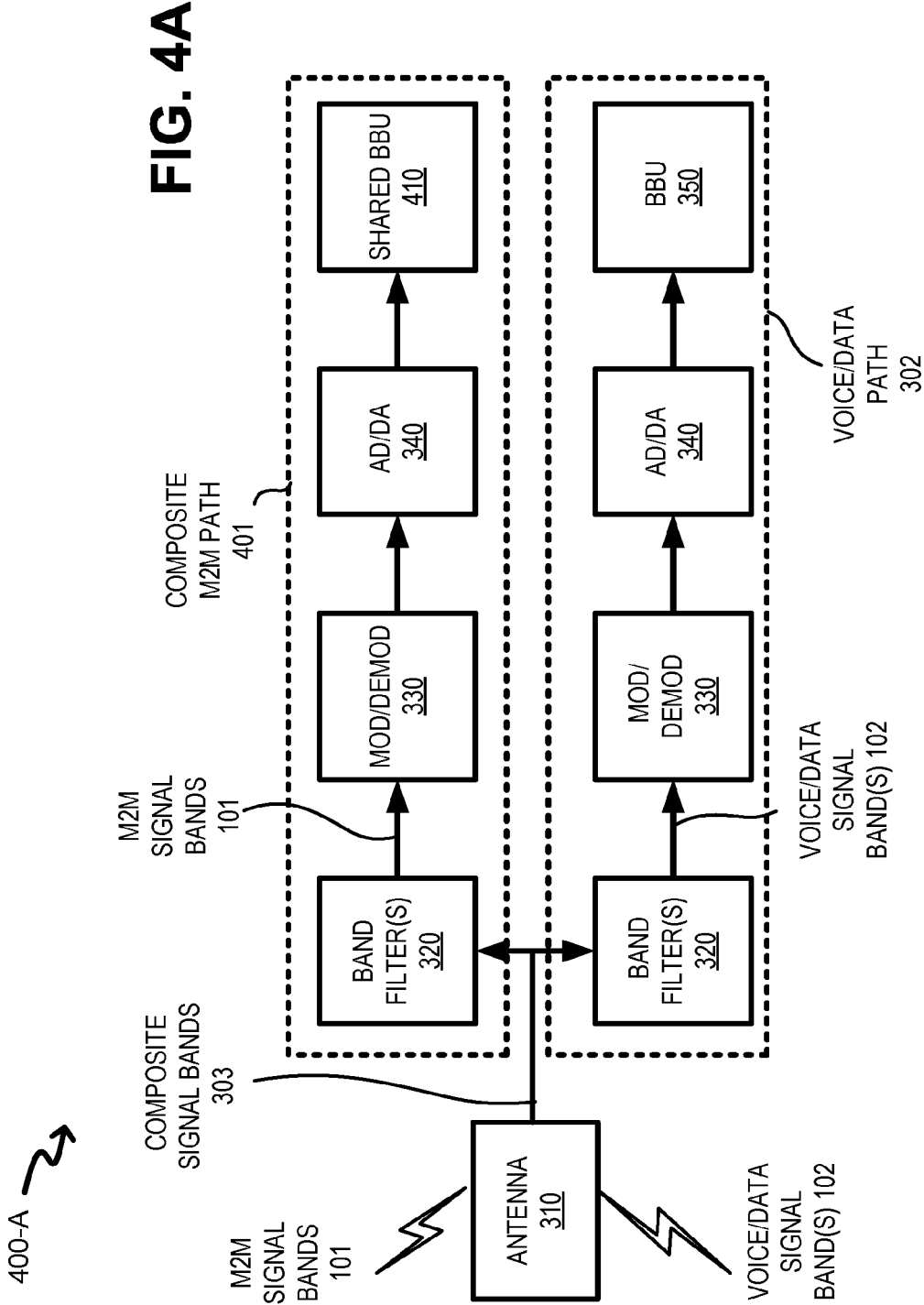

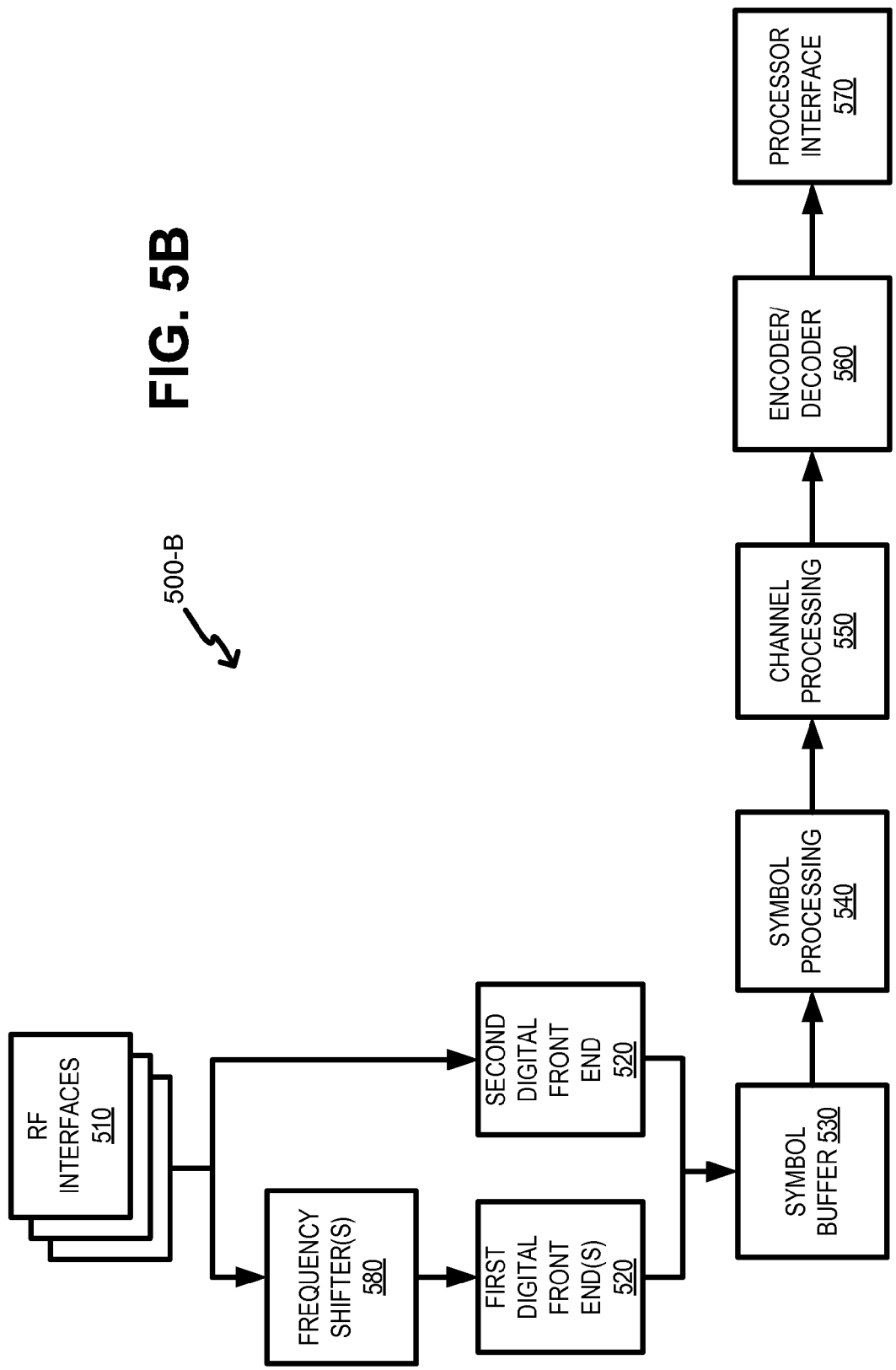

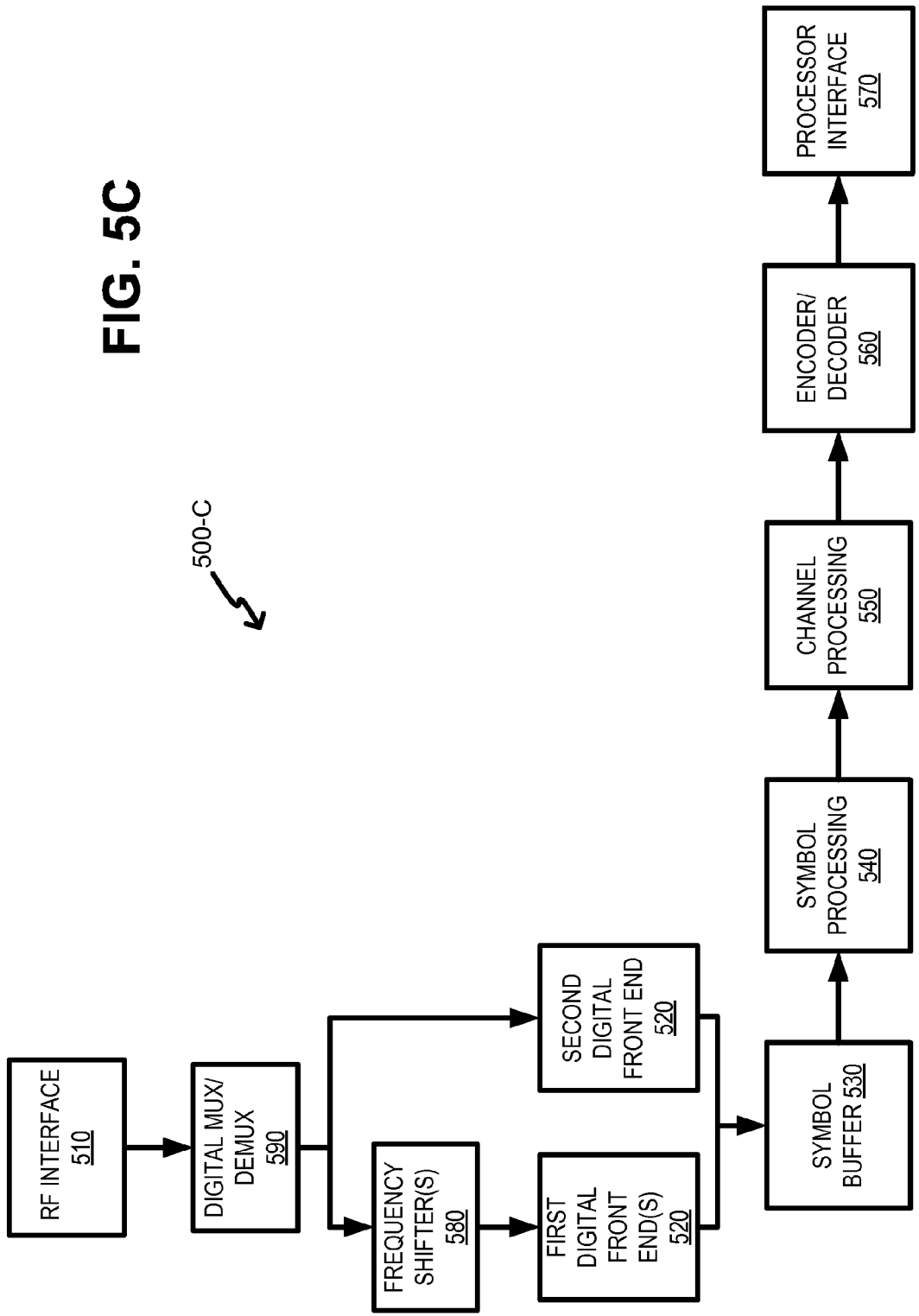

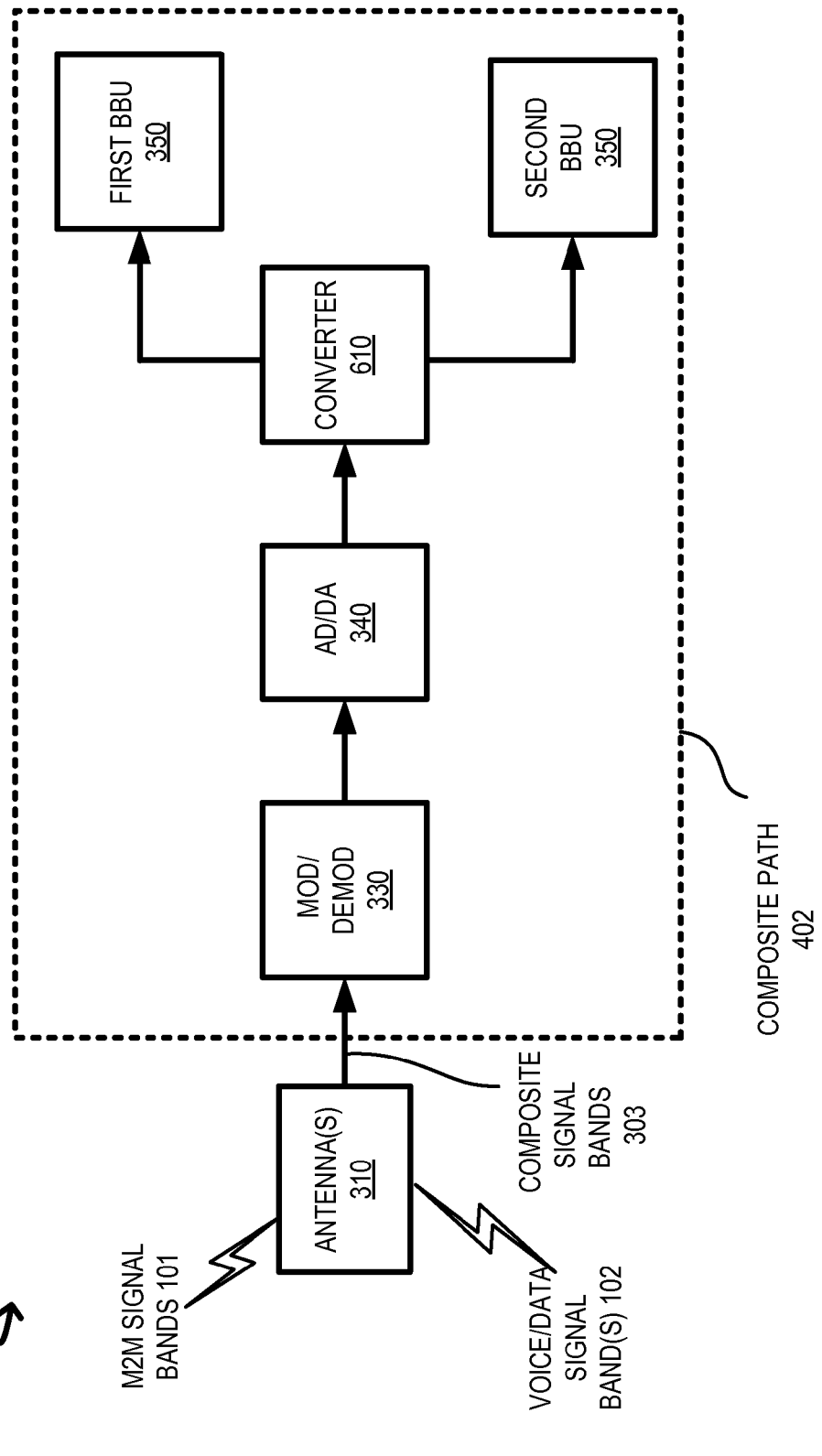

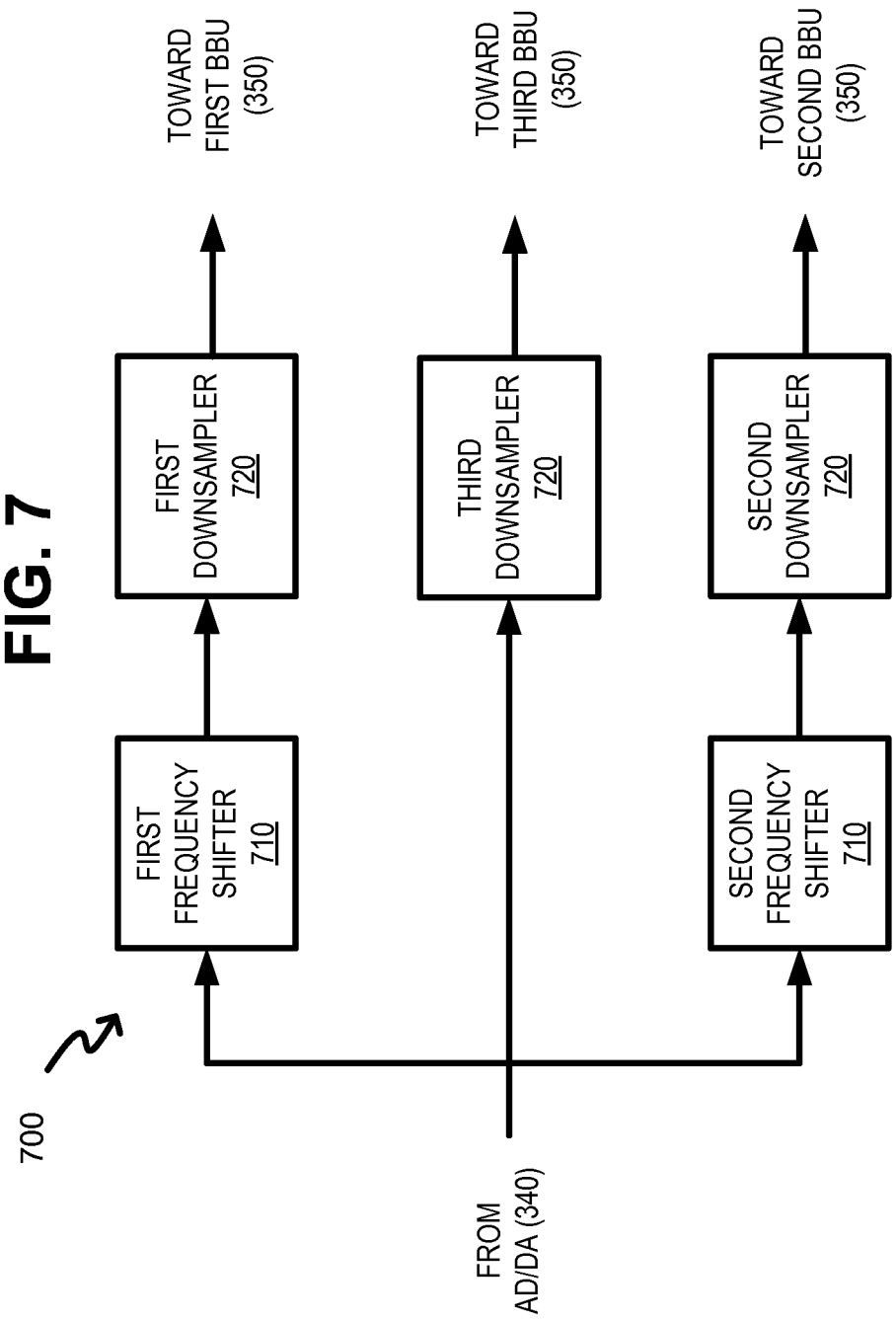

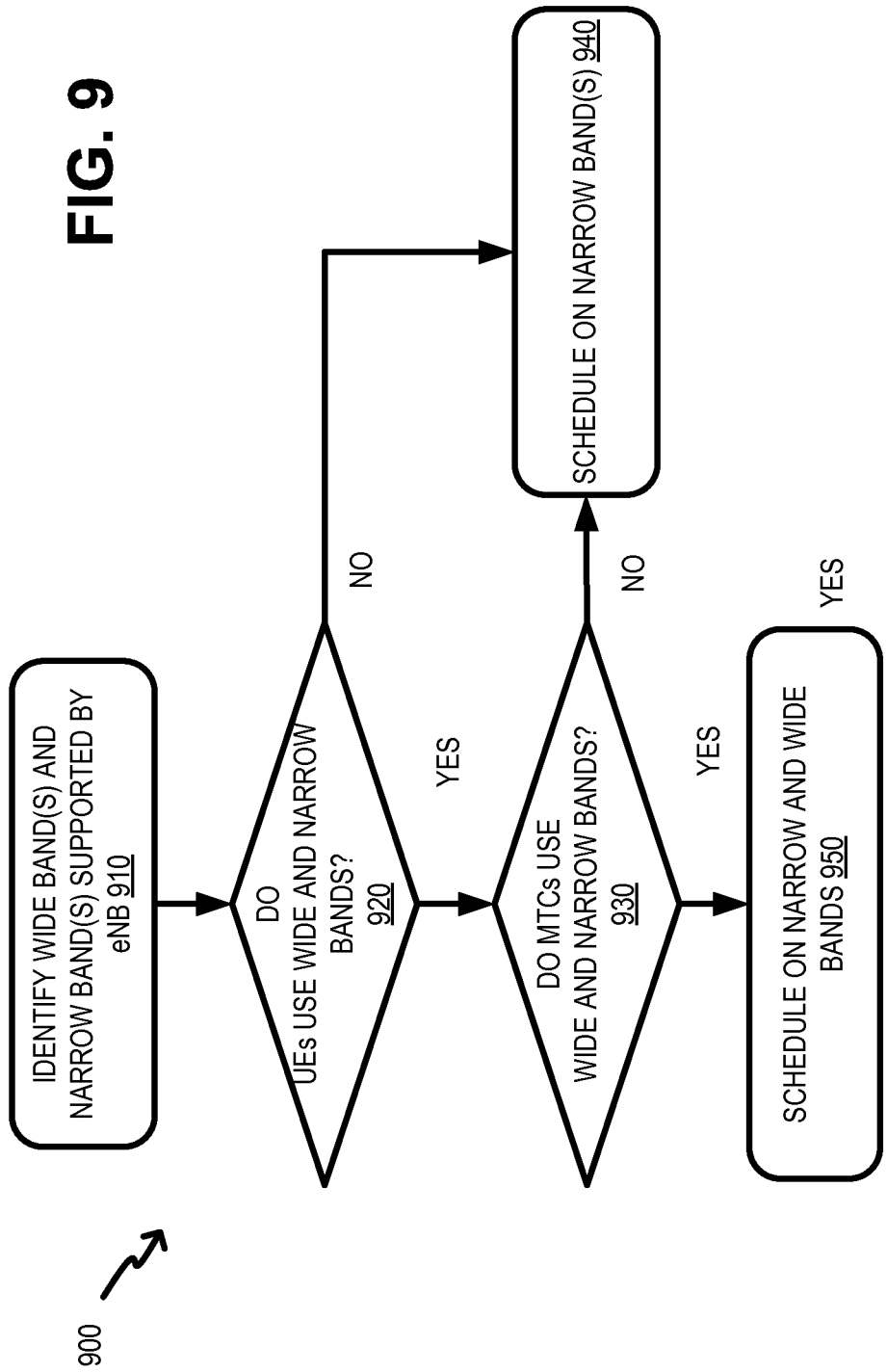

NETWORK SHARING SCHEME FOR MACHINE-TO-MACHINE (M2M) NETWORK

BACKGROUND

Machine to machine communication (M2M) allows (wireless and/or wired) systems to communicate with other devices without manual human interaction. M2M communication may include a wide range of applications for interaction between devices, such as monitoring and control for industrial automation, logistics, Smart Grid, Smart Cities, health, defense, etc. The data transferred during M2M communications may include different types and sizes that may be associated with different applications. For example, M2M communications may include short message, multimedia, etc.

M2M communications may be transmitted over wireless data transmission networks, such as a third generation partnership project (3GPP) network, such as a long-term evolution (LTE) or other fourth generation (4G) network, a universal mobile telecommunications service (UMTS) or other third generation (3G) network, or a global system of mobile communications (GSM) or other second generation (2G) or second-and-a-half generation (2.5G) network. However, M2M communications are typically carried via a specialized network because a base station in 3GPP network may require additional equipment or other modification to carry the M2M communications.

BRIEF DESCRIPTION OF THE DRAWINGS

FIGS. 4A and 4B shows a diagram of exemplary components that may be included in user devices included in the environment shown in FIG. 1;

FIGS. 5A-5C are schematic diagrams that show exemplary components of a shared baseband unit (BBU) device;

FIG. 6 is a diagram of exemplary components of a multiple baseband device;

FIG. 7 is a diagram showing exemplary components of a converter device that may correspond to the converter of FIG. 6;

FIG. 9 shows a flow diagram illustrating an exemplary process for scheduling access to a frequency band shared by MTC devices and UEs.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations discussed herein relate to a base station, such as an enhanced node B, that includes an antenna to receive frequency bands that include a first band associated with first signals carrying machine-to-machine (M2M) data and a second band associated with second signals carrying user equipment (UE) data. The base station may further include a baseband unit (BBU) that has: a radio frequency (RF) interface configured to receive the first signals and the second signals, a digital front end (DFE) configured to generate first symbols based on the first signals and second symbols based on the second signals, a symbol processor configured to convert the first symbols into the M2M data and the second symbols into the UE data, and one or more processors configured to forward the M2M data to a first device and the UE data to a second device that differs from the first device.

Figure 1:
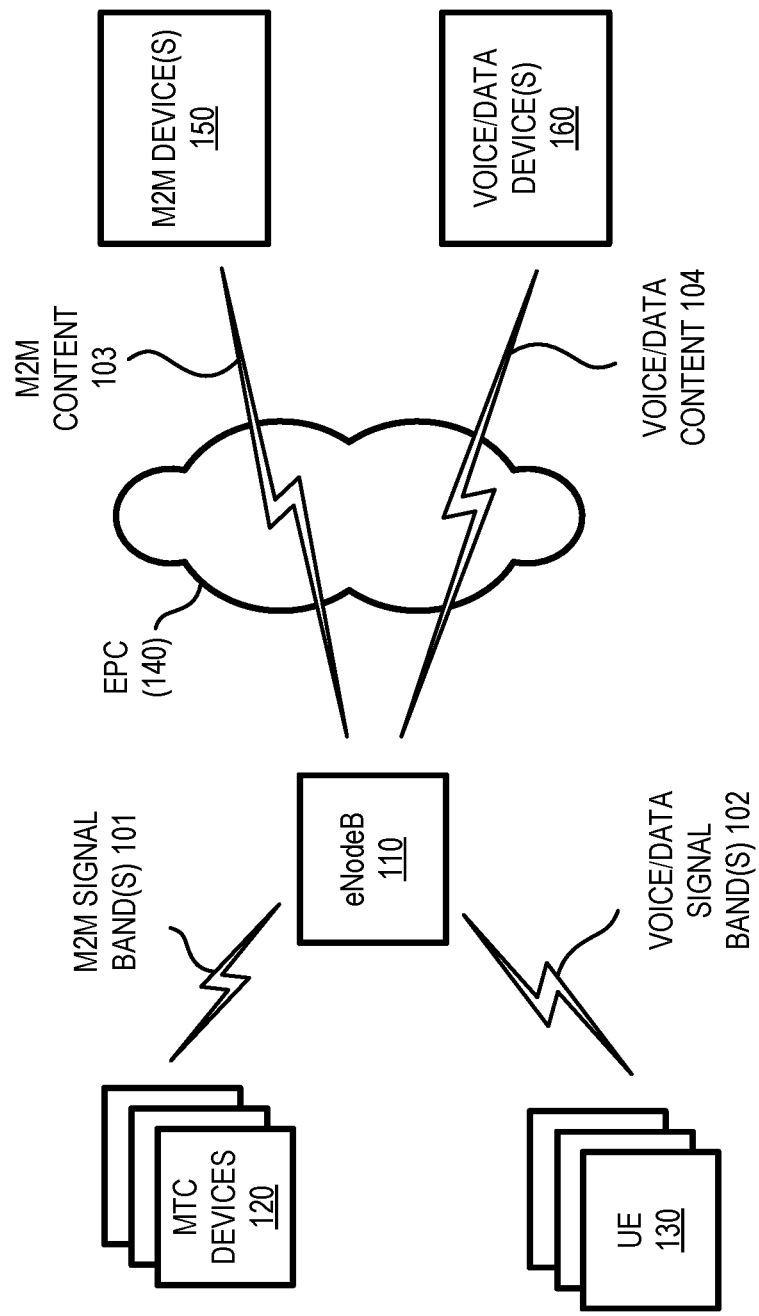
FIG. 1 shows exemplary devices that may be included in an environment in which systems and/or methods described herein may be implemented.

FIG. 1 is a diagram of an exemplary environment 100 in which systems and/or methods described herein may be implemented. As shown in FIG. 1, environment 100 may include an enhanced Node B (eNB) 110, machine type communication (MTC) devices 120, user equipments (UEs) 130, and an evolved packet core (EPC) 140 connecting the eNB to an M2M device 150 or a voice/data device 160. Although not shown, environment 100 may include additional devices, such as a home subscriber server (HSS)/ authentication, authorization, and accounting (AAA) server, a policy and charging rules function (PCRF) device, etc., and additional networks, such as a packet data network (PDN), (e.g., the Internet or a proprietary packet data network). Devices/networks of environment 100 may be interconnected via wired and/or wireless connections.

The eNBs 110 may include network devices that operate according to one or more versions of the LTE communication standard and may receive M2M-related signals from MTC device 120 and other, non-M2M signals from UEs 130. For example, eNB 110 may receive and process one or more M2M bands 101 from MTC device 120, and one or more voice/data bands 102 from UEs 130. Additionally, or alternatively, one or more eNBs 110 may be associated with a wireless network that is not associated with the LTE network (e.g., a wireless hot spot, a wireless access point, a 3G/2G base station, etc.).

Some exemplary frequency bands that may be used for M2M bands 101 and for voice/data bands 102 in North America are identified in Table 1. In Table 1, the "Received Transmission Bands" refers to bands transmitted by MTC 120 and/or UE 130 to eNB 110, and the "Outputted Transmission Bands" refers to bands transmitted by eNB 110 to MTC 120 and/or UE 130.

TABLE 1

Frequency Bands

| Frequency Band Identifier | Received Transmission Bands (Mhz) | Outputted Transmission Bands (Mhz) | Bandwidth (Mhz) |
| --- | --- | --- | --- |
| A" | 824-825 | 869-870 | 1 |
| A | 825-835 | 870-880 | 10 |
| A' | 845-846.5 | 890-891.5 | 1.5 |
| B | 835-845 | 880-890 | 10 |
| B' | 846.5-849 | 890.5-894 | 2.5 |

In one example, M2M bands 101 may include the A' and A" bands, while voice/data bands 102 may include the A band. In this example, two M2M bands 101 are separated by and an intermediate voice/data band 102. It should be appreciated, however, that M2M bands 101 and voice/data bands 102 may include any frequencies and/or range of frequencies.

The eNB 110 may further process M2M signal bands 101 to extract M2M content 103, and eNB 110 may forward, via EPC 140, the M2M content 103 to one or more M2M device 150. M2M device 150 may perform various functions based on M2M content 103. For example, if M2M content 103 relates to the operational status of an MTC device 120, M2M device 150 may schedule maintenance when M2M content 103 indicates an error in the operation of the MTC device 120. The eNB 110 may further process voice/data signal bands 102 to extract voice/data content 104, and eNB 110 may forward, via EPC 140, voice/data content 104 to one or more voice/data devices 160. Voice/data devices 160 may perform various functions based on voice/data content 104. For example, if a UE 130 forwards voice/data content 104 related to a voice over Internet Protocol (VoIP) communication, a voice/data device 160 may establish and manage a session for exchanging VoIP data with the UE 130.

MTC device 120 may include a device that communicates with another device via M2M communications, and the M2M communications do not include manual human input. MTC device 120 may perform M2M or machine type communications. MTC device 120 may communicate via wireless and/or wired networks. MTC device 120 may include a wide range of applications for monitoring and control purposes in fields such as industrial automation, logistics, Smart Grid, Smart Cities, health, defense, etc. MTC device 120 operates according to one or more versions of the LTE communication standard. Alternatively or additionally, MTC device 120 may operate according to a wireless standard for communications via a secondary wireless network. For example, an MTC device 120 in a moving vehicle, such as a telematics unit or other vehicular communication system, may use the IEEE 802.11p protocol to add wireless access in vehicular environments (WAVE).

UE 130 may include a computation and communication device, such as a wireless mobile communication device that is capable of communicating with eNB 140 and/or a network (e.g., IMS core 110). For example, UE 130 may include a cellular telephone; a personal communications system (PCS) terminal (e.g., that may combine a cellular telephone with data processing and data communications capabilities); a personal digital assistant (PDA) (e.g., that can include a radiotelephone, a pager, Internet/intranet access, etc.); a smart phone; a laptop computer; a tablet computer; a camera; a personal gaming system, or another type of mobile computation and communication device. UE 130 may exchange traffic with eNB 110. UE 130 may also, or alternatively, include one or more components such as global positioning system (GPS) components (not shown) that enable a location, associated with UE 130, to be identified.

EPC 140 may include, for example, a mobility management entity (MME), a serving gateway (SGW), a packet data network (PDN) gateway (PGW), and a gateway (GW). For example, the MME may perform idle mode tracking and paging procedures (e.g., including retransmissions) for MTC devices 120, and the SGW may exchange data packets with MTC device 120. The PGW may include one or more data transfer devices (or network devices), such as a gateway, a router, a switch, a firewall, a network interface controller (NIC), a hub, a bridge, a proxy server, an optical add/drop multiplexer OADM, or some other type of device that exchanges data between eNB 110 and M2M devices 150 and/or voice/data devices 160.

The quantity of devices and/or networks, illustrated in FIG. 1, is provided for explanatory purposes only. In practice, there may be additional devices and/or networks, fewer devices and/or networks, different devices and/or networks, or differently arranged devices and/or networks than those illustrated in FIG. 1. Also, in some implementations, one or more of the devices of environment 100 may perform one or more functions described as being performed by another one or more of the devices of environment 100.

Figure 2:
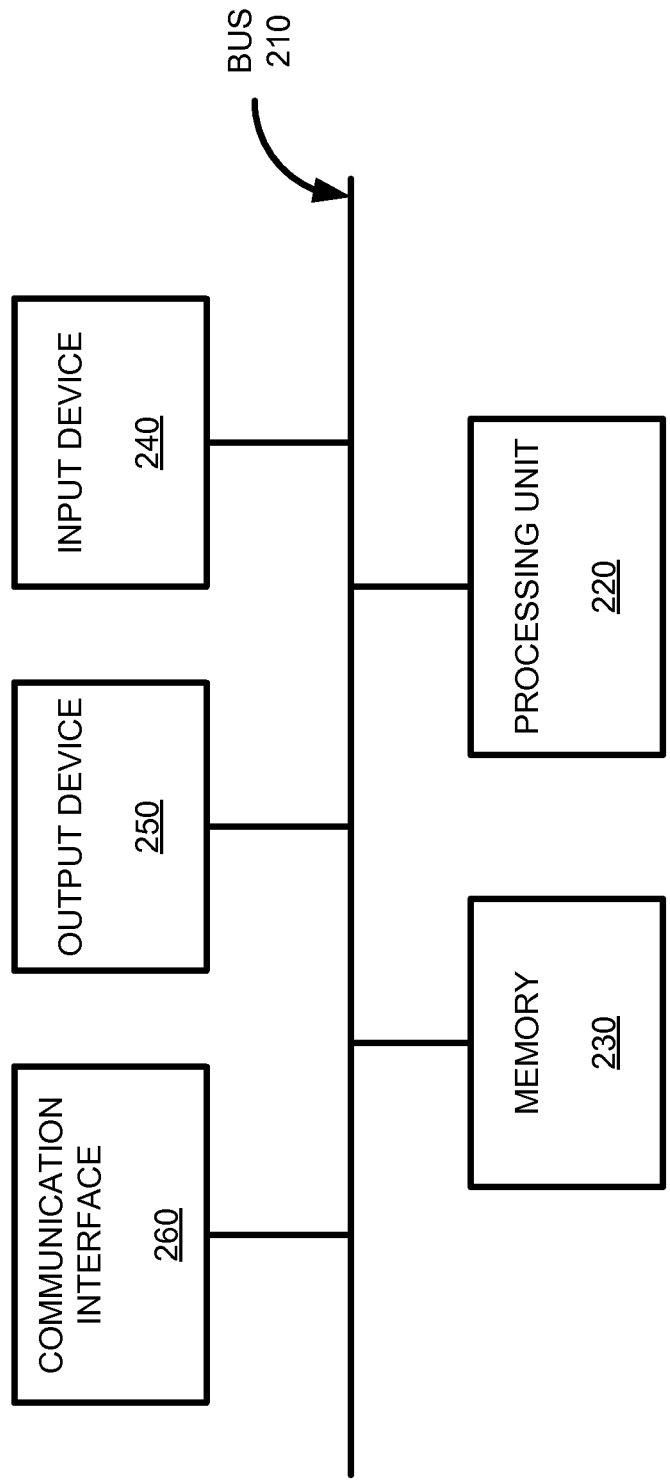
FIG. 2 shows a diagram of exemplary components that may be included in a computing device included in the environment shown in FIG. 1.

FIG. 2 is a diagram illustrating exemplary components of a device 200. Device 200 may correspond, for example, to a component of eNB 110, MTC device 120, UE 130, a component of EPC 140, M2M device 150, or voice/data device 160. Alternatively or additionally, eNB 110, MTC device 120, UE 130, a component of EPC 140, M2M device 150, or voice/data device 160 may include one or more devices 200 and/or one or more components of device 200.

Device 200 may include a bus 210, a processor 220, a memory 230, an input component 240, an output component 250, and a communication interface 260. Although FIG. 2 shows exemplary components of device 200, in other implementations, device 200 may contain fewer components, additional components, different components, or differently arranged components than those depicted in FIG. 2. For example, device 200 may include one or more switch fabrics instead of, or in addition to, bus 210. Additionally, or alternatively, one or more components of device 200 may perform one or more tasks described as being performed by one or more other components of device 200.

Bus 210 may include a path that permits communication among the components of device 200. Processor 220 may include a processor, a microprocessor, or processing logic that may interpret and execute instructions. Memory 230 may include any type of dynamic storage device that may store information and instructions, for execution by processor 220, and/or any type of non-volatile storage device that may store information for use by processor 220. Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc.

Communication interface 260 may include any transceiver-like mechanism that enables device 200 to communicate with other devices and/or systems via wireless communications, wired communications, or a combination of wireless and wired communications. For example, communication interface 260 may include mechanisms for communicating with another device or system via a network. Communication interface 260 may include an antenna assembly for transmission and/or reception of RF signals. For example, Communication interface 260 may include one or more antennas to transmit and/or receive RF signals over the air. Communication interface 260 may, for example, receive RF signals and transmit them over the air to eNB 110, and receive RF signals over the air from eNB 110. In one implementation, for example, communication interface 260 may communicate with a network and/or devices connected to a network. Alternatively or additionally, communication interface 260 may be a logical component that includes input and output ports, input and output systems, and/or other input and output components that facilitate the transmission of data to other devices.

Device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Device 200 may include fewer components, additional components, different components, and/or differently arranged components than those illustrated in FIG. 2. As an example, in some implementations, a display may not be included in device 200. In these situations, device 200 may be a "headless" device that does not include input component 240. Additionally, or alternatively, one or more operations described as being performed by a particular component of device 200 may be performed by one or more other components, in addition to or instead of the particular component of device 200.

Figure 3:
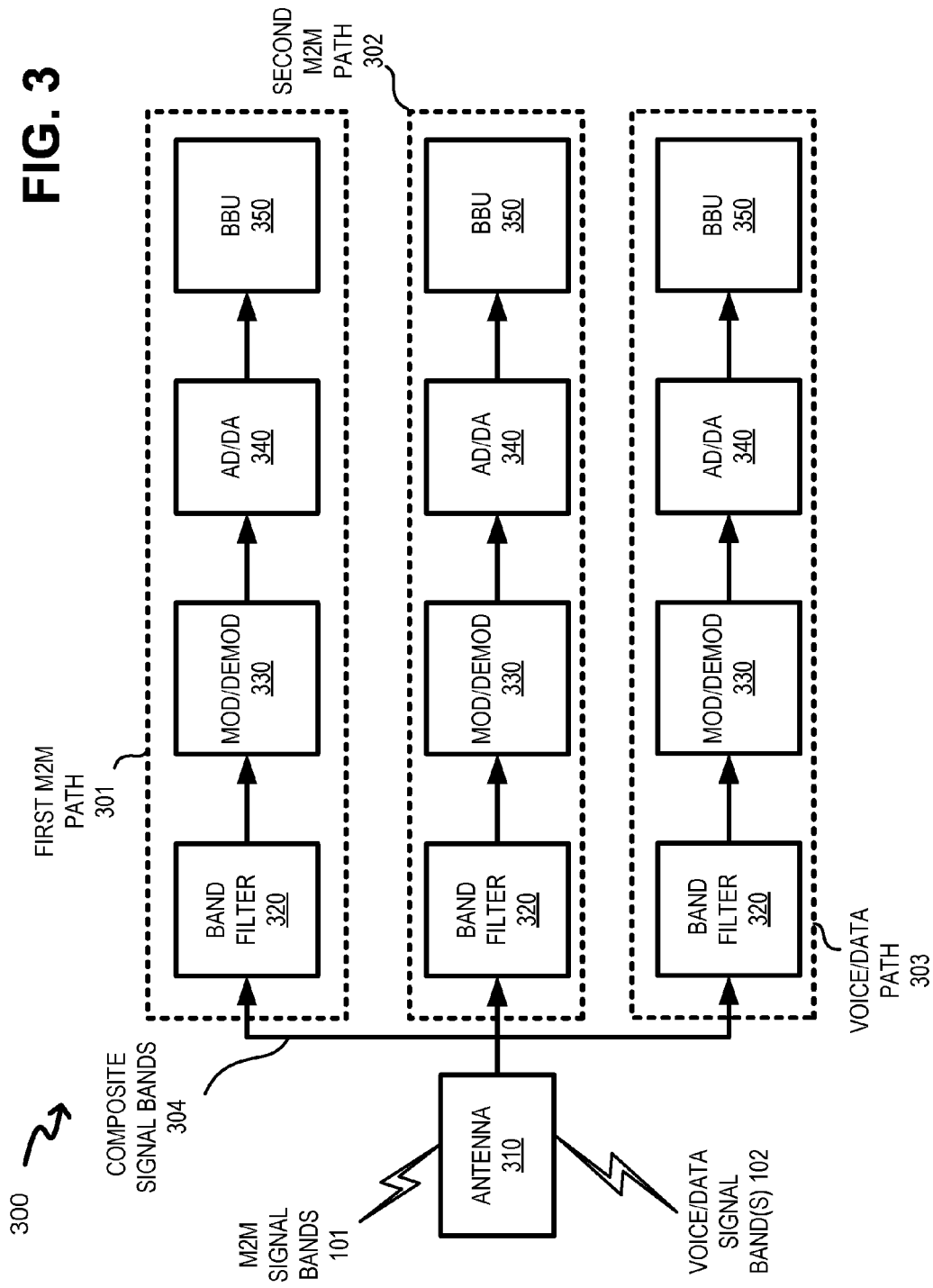
FIG. 3 shows a diagram of exemplary components that may be included in a base station device included in the environment shown in FIG. 1.

FIG. 3 is a diagram of exemplary components of a base station device 300 that may correspond to eNB 110 according to an implementation described herein. As shown in FIG. 3, base station device 300 may include an antenna 310, a first M2M path 301, a second M2M path 302, and a voice/data path 303. As further shown in FIG. 3, each of first M2M path 301, second M2M path 302, and voice/data path 303 may include a band filter 320, a modulator/demodulator (MOD/DEMOD) 330, an analog to digital/digital to analog converter (AD/DA) 340, and a baseband unit (BBU) 350.

Antenna 310 may include a directional and/or omnidirectional structure for receiving wireless signals included in M2M bands 101 and/or voice/data bands 102. Antenna 310 may be coupled to a transceiver (not shown) that includes transceiver circuitry for transmitting and/or receiving traffic with MTC devices 120 and UEs 130 via antennas 310. As shown in FIG. 3, antenna 310 may receive and forward composite signal bands 304 that include both M2M bands 101 and voice/data bands 102.

Band filter 320 may pass frequencies within a particular band or group of bands from composite signal bands 304 and may reject (or attenuate) frequencies in composite signal bands 304 that are outside the particular band or group of bands. For example, if M2M bands 101 include the A" and A' signal bands and voice/data bands 102 includes the A signal band, a first band filter 320 associated with first M2M path 301 may extract the A' band, a second band filter 320 associated with second M2M path 302 may extract the A" band, and a third band filter 320 associated with voice/data path 303 may extract the A band.

MOD/DEMOD 330 (also called a modem) modulates signals to encode digital information and demodulates signals to decode the transmitted information. For example, MOD/DEMOD 330 may extract a data signal carried in a carrier signal within a frequency range or group of frequency ranges. For example, if M2M bands 101 include the A' and A" signal bands and voice/data bands 102 includes the A signal band, a first MOD/DEMOD 330 associated with first M2M path 301 may extract data signals coupled to a carrier signal in the A' band, and a second MOD/DEMOD 330 associated with second M2M path 302 may extract data signals coupled to a carrier signal in the A" band. Similarly, a third MOD/DEMOD 330 associated with voice/data path 303 may extract data signals associated with a carrier signal in the A band. The data signal extracted by MOD/DEMOD 330 may represent encoded signals. For example, AD/DA 340 may convert the data signals into one or more symbols. For example, a phase-shift keying (PSK), an orthogonal frequency-division multiplexing (OFDM), or other digital modulation scheme may be used to convey data by modifying an attribute of the carrier signal, and MOD/DEMOD 330 may extract the encoded data from the modified carrier signal.

AD/DA 340 may convert the data signals extracted by MOD/DEMOD 330 to a digital form to extract data carried by the signals. For example, AD/DA 340 may convert the data signals into one or more symbols. In one implementation, AD/DA 340 associated with first M2M path 301 or second M2M path 302 may use a first conversion scheme for carrying M2M data, and AD/DA 340 associated with voice/data path 303 may use a second, different conversion scheme. In another implementation, the AD/DA 340 associated with first M2M path 301 may use a conversion scheme that differs from a conversion scheme used by the AD/DA 340 associated with second M2M path 302. For example, a certain type of MTC device 120 may send data via a first M2M band 101 using a particular encoding scheme, and another type of MTC device 120 may send data via a second M2M band 101 using a different encoding scheme.

BBU 350 may include one or more processors, microprocessors, etc., that are responsible for digital baseband signal processing. BBU 350 may further handle, for example, termination of a S1 line used for connecting to a core network, such as EPC 140, termination of an X2 line used for connecting with another eNB 110, call processing, and monitoring of control processing.

Base station device 300 may include fewer components, additional components, different components, and/or differently arranged components than those illustrated in FIG. 3. Additionally, or alternatively, one or more operations described as being performed by a particular component of base station device 300 may be performed by one or more other components, in addition to or instead of the particular component of base station device 300.

In the implementation shown in FIG. 3, base station device 300 may correspond to an eNB 110 that includes separate BBUs 350 to handle separate bands included in M2M signal bands 101 and voice/data bands 102. For example, base station device 300 may include a BBU 350 in voice/data path 303 that handles A band signals, and BBUs 350 in first M2M path 301 and second M2M path 301 that handle, respectively, A' and A" bands.

Figure 4B:
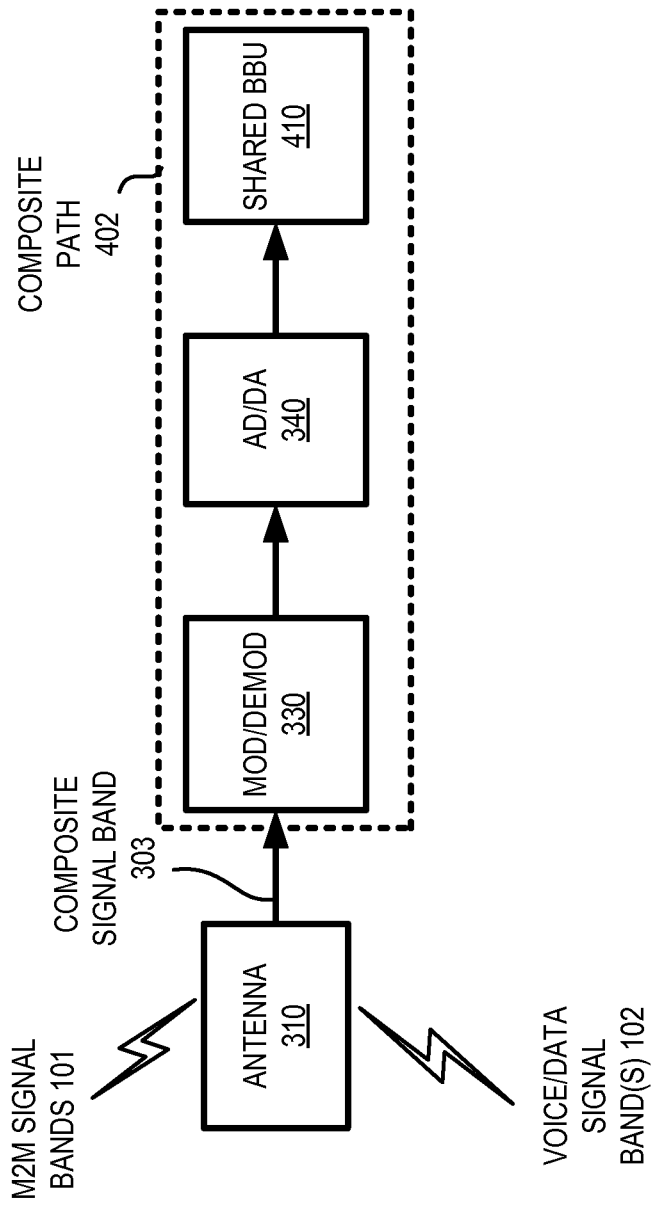

In other implementation shown in FIGS. 4A and 4B, a sharing base station device 400 (shown as sharing base station device 400-A in FIG. 4A and as sharing base station device 400-B in FIG. 4B) may include a shared BBU 410 that handles two or more signal bands and components of base station device 300 (e.g., antenna 310, band filter 320, MOD/DEMOD 330, AD/DA 340, and/or BBU 350). In one example shown in FIG. 4A, sharing base station device 400-A has a composite M2M path 401 that includes a shared BBU 410 for handling multiple M2M signal bands 101 and a voice/data path 302 that includes BBU 350 for handing a particular signal band. For instance, shared BBU 310 may handle transmission from MTC devices 120 in the A' and A" bands, whereas BBU 350 may handle transmission from UEs 130 in the A band. The band filter 320 included composite M2M path 401 may extract the A' and A" bands from composite signals bands 303.

In another example shown in FIG. 4B, sharing base station device 400-B may include a composite path 402 that has a shared BBU 410 for handling a composite signal band 303 that includes both M2M signal bands 101 from MTC devices 120 and voice/data signal band 102 from UEs 130. For instance, shared BBU 310 may handle transmission from MTC devices 120 in the A' and A" bands and transmission from UEs 130 in the A band.

Figure 5A:
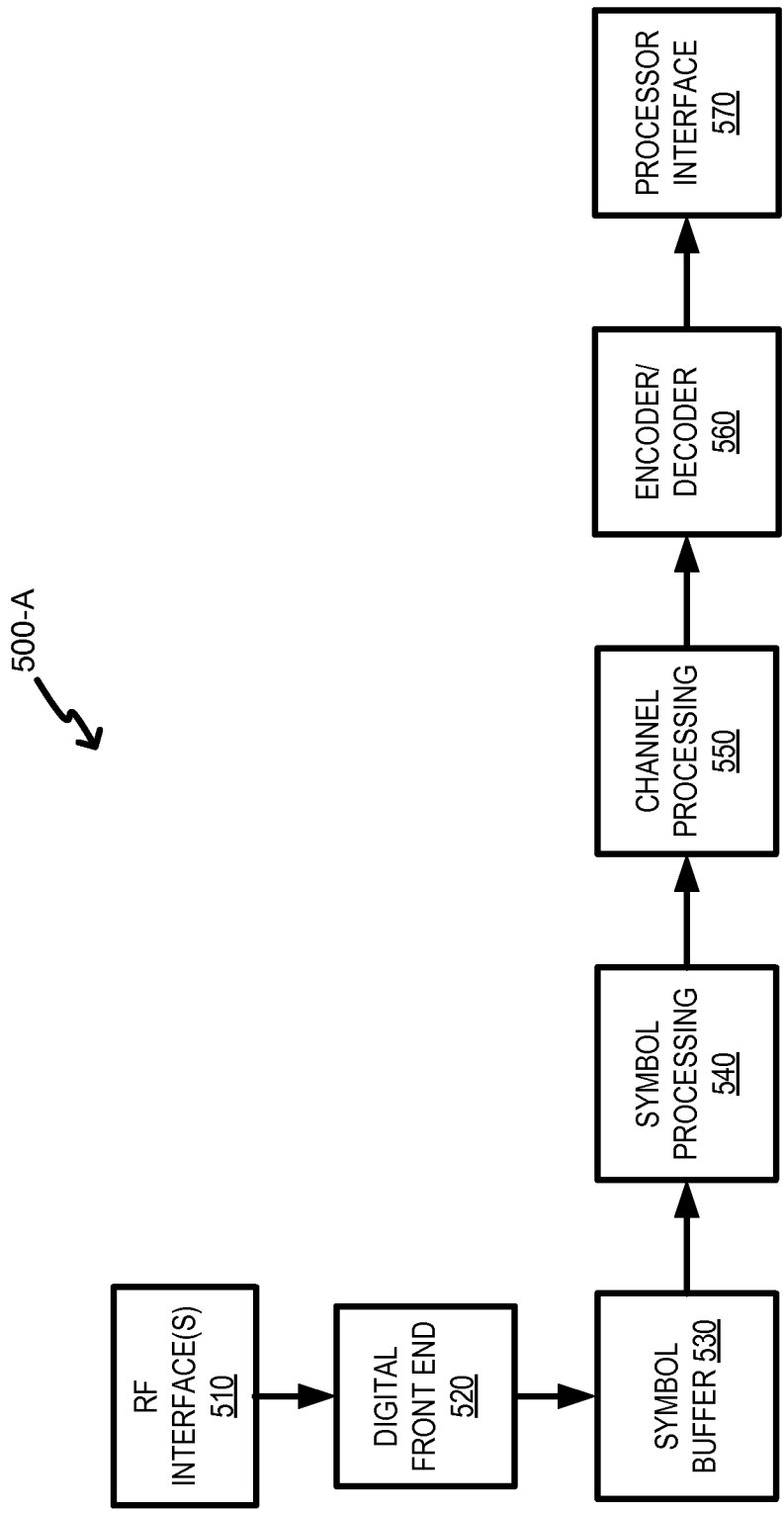

FIGS. 5A-5C are schematic diagrams that show exemplary components of a shared BBU device 500 (shown respectively in FIGS. 5A-5C as shared BBU devices 500-A through 500-C) that may correspond to shared BBU 410. As described in greater detail below, shared BBU device 500 may include one or more components for handling multiple signal bands included in M2M signals bands 101 and/or voice/data signal bands 102, such as signals bands A' and A" or signal bands A, A', and A".

FIG. 5A illustrates a shared BBU device 500-A that may be used to handle time-aligned symbols carried on different signals bands included in M2M signals bands 101 and/or voice/data signal bands 102. As shown in FIG. 5A, shared BBU device 500-A may include a radio frequency (RF) interface 510, a digital front end (DFE) 520, a symbol buffer 530, symbol processing 540, channel processing 550, an encoder/decoder 560, and a processor interface 570.

RF interface 510 may provide an interface that enables DFE 520 to obtain symbol data from AD/DA 340. Shared BBU device 500-A may include separate RF interface 510 that receive symbol data associated with respective M2M bands 101 and voice/data bands 102. For example, shared BBU device 500-A may include a first RF interface 510 for receiving symbol data associated with the A band, a second RF interface 510 for receiving symbol data associated with the A' band, and a third RF interface 510 for receiving symbol data associated with the A" band. Additionally or alternatively, shared BBU device 500-A may include first RF interface 510 that receives symbols carried on two or more M2M bands 101 and voice/data bands 102.

In the configuration shown in FIG. 5A, the symbols may be time-aligned by AD/DA 340 so that symbols are associated with a symbol band are received at particular time slots. DFE 520 may identify a time slot allocated to a frequency band, and DFE 520 may associate a symbol received during the time slot with the frequency band. DFE 520 may include 1024, 1228, 2048 or other sized fast Fourier transforms (FFT) to recover the symbol data received by RF interface 510. DFE 520 may further group together, in symbol buffer 530, symbols associated with a same frequency band or group of frequency bands. Furthermore, DFE 520 may store null values for subcarriers associated with any time slots that are not allocated to particular frequencies bands. For example DFE 520 may null certain subcarriers to separate subcarriers associated with the A, A', and A" bands.

Continuing with FIG. 5A, symbol processing 540 may access the grouped symbols stored in symbol buffer 530 and may convert the grouped symbols into data, such as packets, and channel processing 550 may perform media access control (MAC) and physical (PHY) channel processing on the converted data, and encoder/decoder 560 may prepare the data for transport. Processor interface 570 may provide a connection to forward data encoded by encoder/decoder 560 to EPC 140.

In another implementation shown in FIG. 5B, sharing BBU 500-B may be configured to handle symbols carried on different signals bands included in M2M signals bands 101 and/or voice/data signal bands 102 that are not time-aligned. For example, sharing BBU 500-B may include one or more frequency shifters 580 that forward symbols associated with certain frequency bands to one or more first digital front ends 520 while another, second digital front end 520 may receive symbols associated with another frequency band that are not modified by frequency shifter 580. Frequency shifters 580 may direct symbols associated with transmission from MTC devices 120 to first digital front ends 520 without shifting symbols associated with transmissions from UEs 130.

For instance, if MTC devices 120 transmit on the A' and A" bands, a first frequency shifter 580 may shift symbols associated with the A' band in a first direction (e.g., shifting the symbols up), and a second frequency shifter 580 may shift signals associated with the A" band in a second direction (e.g., shifting the symbols down). If UEs 130 transmit on the A band, symbols associated with the A band may be unaffected by first and second frequency shifters 580. The shifted symbols may be received and processed by first digital front end 520 and grouped together in symbol buffer 530. Furthermore, unshifted symbols may be received and processed by second digital front end 520 and grouped together in symbol buffer 530. In this example, first digital front ends 520 may include 256 FFTs to decode M2M related signals, and second digital front end 520 may include a relatively larger FFT (such as a 1024 FFT) to handle the relatively larger A band associated with the voice/data signals from UEs 130. Symbol processing 540, channel processing 550, encoder/decoder 560, and processor interface may operate as described above with respect to FIG. 5A, to process the grouped symbols to forward associated data to M2M devices 150 and voice/data devices 160.

In the implementations shown in FIGS. 5A and 5B, shared BBUs 500 may include a quantity of RF interfaces 510 that corresponds to the number of bands included in M2M bands 101 and voice/data bands 102. For example, if M2M bands 101 include the A' and A" bands, and voice/data band 102 includes the A band, shared BBU 500 may include three RF interfaces 510.

In another implementation shown in FIG. 5C, shared BBU 500-C may include a quantity of RF interface(s) 510 that is less than the quantity of signal bands included in M2M bands 101. Shared BBU 500-C may include a digital multiplexor/demultiplexor (MUX/DEMUX) 590 to generate and forward multiple copies of received signals. In the example shown in FIG. 5C, shared BBU 500-C may be configured to handle non-time-aligned signals using one or more frequency shifters 590 that operate, as described above with respect to FIG. 5B, direct M2M-related symbols to first digital front end(s) 520, and voice/data related symbols to second digital front ends 520. In this example, MUX/DEMUX 590 may direct certain symbols to frequency shifters 580 and other transmitted symbols to second digital front end 520. If the symbols are time-aligned, shared BBU 500-C may omit frequency shifters 580 and MUX/DEMUX 590 may, instead, forward the time-aligned symbols to one or more front end 520 to be sorted based on the time slots associated with the time-aligned symbols.

Although FIGS. 5A-5C show exemplary components of shared BBU device 500, in other implementations, shared BBU device 500 may include fewer components, additional components, different components, or differently arranged components than those depicted in FIGS. 5A-5D. In still other implementations, one or more components of shared BBU device 500 may perform one or more tasks described as being performed by one or more other components of shared BBU device 500.

FIG. 6 is a diagram of exemplary components of a multiple baseband device 600 that may correspond to eNB 110 according to an implementation described herein. As shown in FIG. 6, multiple baseband device 600 may include antenna 310, band filter 320, MOD/DEMOD 330, and AD/DA 340 that operate as described above with respect to FIG. 3 to process and handle composite signal bands 303. As also shown in FIG. 6, multiple baseband device 600 may further include a converter 610 to direct signal bands to different BBUs 350. For example, multiple baseband device 600 may include a first BBU 350 to handle M2M signals bands 101, and a second BBU 350 to handle voice/data signals bands 102. Converter 610 may direct certain bands to first BBU 350, and other bands to second BBU 350.

Although FIG. 6 shows exemplary components of separate basebands base station device 600, in other implementations, basebands device 600 may include fewer components, additional components, different components, or differently arranged components than those depicted in FIG. 6. In still other implementations, one or more components of multiple baseband device 600 may perform one or more tasks described as being performed by one or more other components of separate basebands base station device 600.

FIG. 7 is a diagram showing exemplary components of a converter device 700 that may correspond to converter 610 included in multiple baseband device 600 according to an implementation described herein. As shown in FIG. 7, converter device 700 may include one or more frequency shifters 710 and multiple downsamplers 720. Converter device may be a field programmable gate array (FPGA) that includes a first portion (corresponding to frequency shifters 710) to perform one or more digital frequency shifts and a second portion (corresponding to downsampler 720) to perform a low pass filtering and to sample the remaining symbols.

A frequency shifter 710 may forward symbols associated with certain frequency bands toward an downsampler 720 while downsampler 720 may receive symbols associated with another frequency band that are not modified by frequency shifter 710. In the example shown in FIG. 1, first frequency shifter 710 may direct symbols associated with transmission from MTC devices 120 in the A' band to first downsampler 720, and second frequency shifter 710 may direct symbols associated with transmission from MTC devices 120 in the A" band to second downsampler 720. For example, first downsampler 720 may be designed to filter out shifted symbols handled by second downsampler 720 and any unshifted symbols, and second downsampler 720 may be designed to filter out shifted symbols handled by first downsampler 720 and any unshifted symbols.

Third downsampler 720 may receive symbols that are not affected by frequency shifters 710. For example, if UEs 130 transmit on the A band, symbols associated with the A band may be unaffected by first and second frequency shifters 710 (which shift symbols associated with data on the A' and A" bands). The unshifted symbols may be received and processed by third downsampler 720. The third downsampler 720 would filter out shifted symbols handled by first and second downsamplers 720.

Although FIG. 7 shows exemplary components of converter device 700, in other implementations, converter device 600 may include fewer components, additional components, different components, or differently arranged components than those depicted in FIG. 7. In still other implementations, one or more components of converter device 700 may perform one or more tasks described as being performed by one or more other components of converter device 700.

Figure 8:
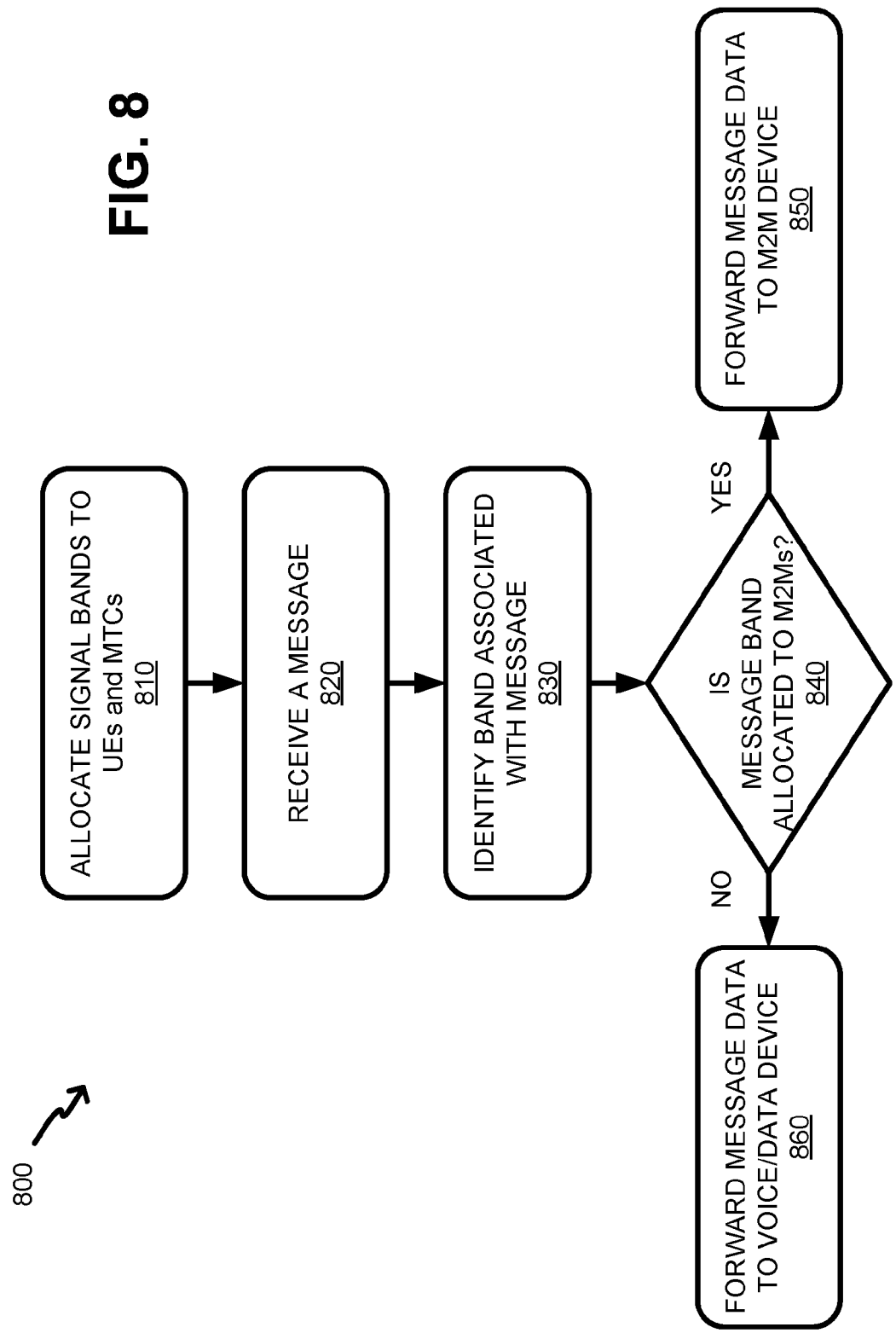
FIG. 8 shows a flow diagram illustrating an exemplary process for handling M2M bands from machine type communication (MTC) devices and voice/data bands from use equipment (UE) according to one implementation.

FIG. 8 is a flow diagram illustrating an exemplary process 800 for handling M2M data from MTC device 120. In one implementation, process 800 may be performed by eNB 110. In other implementations, process 800 may be performed by one or more other devices of environment 100, such as a component of EPC 140.

As shown in FIG. 8, process 800 may include allocating signal bands to UEs 130 and MTC devices 120 (block 810). For example, one of the A, A', and A" bands may be allocated to UEs 130, and the remaining two bands may be used by MTC devices 120. As previously described, MTC devices 120 may use M2M bands 101 that include the A' and A" bands, and UEs 130 may use voice/data bands 102 that include the A band. It should be appreciated, however, that this example is given merely for purposes of illustration, and other bands allocations may be used within discussed implementations. For example, M2M band 101 may include a narrow band (e.g., only includes the A' band) or a wide band that includes the A and A" bands. In another example, eNB 110 may be configured to handle only M2M communications, so that the A, A', and A" bands are allocated to the MTC devices 120.

In yet another example, a particular type (or brand) of MTC devices 120 may transmit on a first portion of M2M band 101, and another type (or brand) of MTC devices 120 may transmit on a second, different portion of M2M band 101. For example, a first type of MTC device 120 may transmit on a first portion of the A' band and a second type of MTC device 120 may transmit on a second portion of the A' band. For instance, a first portion of M2M band 101 may carry commercial data, such as utility meter readings, a second portion of M2M band 101 may carry a vehicle data, such as telematic readings, and a third portion of M2M band 101 may carry device status data, such as an indication of whether devices are being used and are operational.

As shown in FIG. 8, process 800 may further include receiving a message (block 820) and identifying a frequency band or group of frequency bands associated with the message (block 830). For example, the message may be received at antenna 310, and the message may be forwarded to a BBU 350 by a band filter 320 (see FIGS. 3 and 4A). Furthermore, BBU 350 may include a digital front end 520 (FIG. 5A) to sort time-aligned symbols associated with different frequency bands or a frequency shifter 580 (FIG. 5B) to direct symbols associated with different frequency bands to different digital front ends 520.

Continuing with process 800 in FIG. 8, eNB 110 may determine whether the frequency band associated with the message is allocated to M2M band 101 (block 840). If the message is received via a frequency included in M2M band 101 (block 840—yes), the message data is forwarded to M2M device (block 850). Otherwise, if the message is received via a frequency not included in M2M band 101 (block 840—no), the message data may be forwarded to voice/data device 160 (block 860). For example, as described with respect to FIG. 3, eNB 110 may include symbol processing 540, channel processing 550, encoder/decoder 560, and processor interface that operate as described above with respect to FIGS. 5A and 5B, to process data from a received message and to forward the data to M2M devices 150 and voice/data devices 160.

In the above discussions, different frequency bands (or groups of frequency bands) are allocated to M2M bands 101 and to voice/data bands. For example, one of the A, A', and A" bands may be allocated to UEs 130, and the remaining two bands may be used by MTC devices 120. In one implementation, M2M bands 101 and/or voice/data bands 102 may include other bands, such as the B and/or B' bands. In another implementation, MTC devices 120 and UEs 130 may share one or more bands. For example, both MTC devices 120 and UEs 130 may use both the A, A', and/or A" bands. In this other implementation, access to a shared band or group of bands may be scheduled to avoid band conflicts.

FIG. 9 is a flow diagram illustrating an exemplary process 900 for scheduling access to a frequency band shared by MTC devices 120 and UEs 130. In this way, MTC devices 120 and UEs 130 may both use one or more common frequency bands (e.g., both use the A band). The bands may be shared, for example, based on network conditions, such as congestion/bandwidth on a band that exceeds a threshold. In another instance, MTC devices 120 and UEs 130 may share a frequency bands if environmental conditions cause interference/signal loss in one or more other frequency bands. In yet another instance, MTC devices 120 and UEs 130 may share a frequency band if MTC devices 120 and/or UEs 130 are designed to function on the same band. In this last instance, a device may function as an MTC device 120 in certain instances (e.g., when providing status information) and as a UE 130 in other instances (e.g., when providing communications), and the device may use the same frequency band in both roles (e.g., function as UE 130 during certain time periods and as MTC device 120 during other time periods). In one implementation, process 900 may be performed by eNB 110. In other implementations, process 900 may be performed by one or more other devices of environment 100, such as a component of EPC 140 or an external controller (not shown).

As shown in FIG. 9, process 900 may include identifying narrow bands and wide bands supported by eNB 110 (block 910). For example, certain eNBs 110 may receive and process signals transmitted via the A, A', and the A" bands, while other eNBs 110 may not support all three bands. In the following discussion, the A band is considered a wide band, while the A' and A" bands are considered, individually, to be narrow bands.

The eNB 110 may determine whether UEs 130 use both wide and narrow bands (block 920) and whether MTC devices 120 use both wide and narrow bands (block 930). For example, if UEs 130 use only narrow bands such as the A' and/or A" bands, (block 920—No) and MTC devices 120 use only narrow bands such as the A' and/or A" bands, (block 930—No), eNB 110 schedules access by the MTC devices 120 and the UEs 130 to the shared narrow band (block 940). For example, access to the shared narrow band may be allocated in a ping-pong fashion so that the MTC devices 120 and the UEs 130 may send/receive on the narrow band during alternating time periods. In another example, the allocation of the narrow band may vary based on the relative amounts of data exchange by MTC devices 120 and UEs 130. For example, if UEs 130 exchange ten times the amount of data as MTC devices 120, eNB 110 may allocate a signal time period to MTC devices 120 and 10 subsequent time periods to UEs 130.

If UEs 130 use narrow and wide bands such as the A band in combination with the A' and/or A" bands, (block 920—Yes), and MTC devices 120 use also narrow and wide bands (block 930—Yes), eNB 110 schedules access by the MTC devices 120 and the UEs 130 to the shared narrow band and wide bands (block 950). For example, MTC devices 120 and the UEs 130 may access the wide and narrow bands during alternating time periods. In another example, MTC devices 120 and the UEs 130 may alternate access the wide and narrow bands, such as causing MTC devices 120 to use the A band during a time period and directing UEs 130 to use the A' and/or A" bands during that time period, while causing MTC devices 120 to use the A' and/or A" bands during a subsequent time period and directing UEs 130 to use the A band during this subsequent time period.

Various preferred embodiments have been described herein with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

It will be apparent that different aspects of the description provided above may be implemented in many different forms of software, firmware, and hardware in the implementations illustrated in the figures. The actual software code or specialized control hardware used to implement these aspects is not limiting of the implementations. Thus, the operation and behavior of these aspects were described without reference to the specific software code—it being understood that software and control hardware can be designed to implement these aspects based on the description herein.

For example, while a series of blocks has been described with respect to FIGS. 8 and 9, the order of the blocks in processes 800 and 900 may be modified in other implementations. Furthermore, non-dependent blocks may be performed in parallel. Furthermore, processes 800 and 900 may include additional and/or fewer blocks than shown in FIGS. 8 and 9.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
   an antenna configured to receive a plurality of frequency bands, wherein the plurality of frequency bands include a first band associated with first signals carrying machine-to-machine (M2M) data, and a second band associated with second signals carrying user equipment (UE) data; and
   a baseband unit (BBU) that includes:
   a radio frequency (RF) interface configured to receive the first signals and the second signals,
   a digital front end (DFE) configured to:
   generate first symbols based on the first signals and
   generate second symbols based on the second signals, wherein the first symbols and the second symbols are time aligned, store, based on the time alignment, the first symbols at a first portion of a buffer, and store, based on the time alignment, the second symbols at a second portion of the buffer, a symbol processor configured to:

convert, based on contents stored at the first portion of the buffer, the first symbols into the M2M data, and convert, based on contents stored at the second portion of the buffer, the second symbols into the UE data, and one or more processors configured to forward the M2M data to a first device and forward the UE data to a second device that differs from the first device.

2. The system of claim 1, wherein the DFE includes a plurality of DFEs, wherein the BBU further includes:

a frequency shifter configured to shift frequencies associated with the first signals without modifying frequencies associated with the second signals, and wherein the plurality of DFEs include:

a first DFE configured to generate the first symbols based on the frequency shifted first signals; and a second DFE configured to generate the second symbols based on the second signals.

3. The system of claim 2, wherein the first DFE includes a first fast Fourier transform (FFT) of a first size, and the second DFE includes a second FFT of a second size that is larger than the first size.

4. The system of claim 3, wherein the RF interface is further configured to:

receive a composite signal that includes the first signals and the second signals, and wherein the BBU further includes:

a digital multiplexor configured to:

receive the composite signal from the RF interface, generate a first copy of the composite signal and generate a second copy of the composite signal, forward the first copy of the composite signal to the first DFE, and forward the second copy of the composite signal to the second DFE.

5. The system of claim 1, wherein the BBU includes a plurality of BBUs, and wherein the plurality of BBUs include:

a first BBU configured to convert the first signals into the M2M data, and a second BBU configured to convert the second signals the UE data.

6. The system of claim 5, further comprising:

a converter configured to forward the first signals to the first BBU and the second signals to the second BBU.

7. The system of claim 6, wherein the converter includes:

a frequency shifter configured to shift frequencies associated with the first signals without modifying frequencies associated with the second signals, a first downsampler configured to:

receive the frequency-shifted first signals and the second signals, filter out the second signals, and forward the first signals to the first BBU; and a second downsampler configured to:

receive the frequency-shifted first signals and the second signals, filter out the frequency-shifted first signals, and forward the second signals to the second BBU.

8. The system of claim 5, wherein the first band is included in a plurality of first bands, and wherein the first BBU is further configured to recover the M2M data carried on the plurality of first bands.

9. The system of claim 1, wherein the first band includes a first range of frequencies and a second range of frequencies that are separated by a third range of frequencies included in the second band.

10. The system of claim 1, wherein a group of frequencies is included in the first band and the second band, and wherein the BBU is further configured to schedule use of the group of frequencies, wherein scheduling the use of the group of frequencies causes the group of frequencies to carry the M2M data during a first time period and carry the UE data during a second time period.

11. A method comprising:

receiving, by one or more processors associated with a base station, a plurality of frequency bands, wherein the plurality of frequency bands include a first band associated with first signals carrying machine-to-machine (M2M) data, and a second band associated with second signals carrying user equipment (UE) data;

generating, by the one or more processors, first symbols based on the first signals and generating second symbols based on the second signals, wherein the first symbols and the second symbols are time aligned;

storing, by the one or more processors based on the time alignment, the first symbols at a first portion of a buffer;

storing, by the one or more processors based on the time alignment, the second symbols at a second portion of the buffer;

converting, by the one or more processors based on contents stored at the first portion of the buffer, the first symbols into the M2M data;

converting, by the one or more processors based on contents stored at the second portion of the buffer, the second symbols into the UE data; and forwarding, by the one or more processors, the M2M data to a first device and forwarding the UE data to a second device that differs from the first device.

12. The method of claim 11, wherein generating the first symbols and the second symbols includes:

shifting frequencies associated with the first signals without modifying frequencies associated with the second signals;

generating the first symbols based on the frequency shifted first signals; and generating the second symbols based on the second signals.

13. The method of claim 11, wherein converting the first symbols into the M2M data and converting the second symbols into the UE data includes:

performing a first fast Fourier transform (FFT) on the first signals; and performing a second FFT on the second signals.

14. The method of claim 11, wherein the first band includes a first range of frequencies and a second range of frequencies that are separated by a third range of frequencies included in the second band.

15. The method of claim 11, wherein the one or more processors include a first processor associated with a first baseband unit (BBU) and a second processor associated with a second BBU, and wherein the first processor converts the first symbols into the M2M data and the second processor converts the second symbols into the UE data.

16. A non-transitory computer-readable medium to store instructions, the instructions comprising:

one or more instructions that when executed by a processor associated with a base station, cause the processor to:
receive a plurality of frequency bands, wherein the plurality of frequency bands include a first band associated with first signals carrying machine-to-machine (M2M) data, and a second band associated with second signals carrying user equipment (UE) data;
generate first symbols based on the first signals and generate second symbols based on the second signals, wherein the first symbols and the second symbols are time aligned;
store, based on the time alignment, the first symbols at a first portion of a buffer;
store, based on the time alignment, the second symbols at a second portion of the buffer;
convert, based on contents stored at the first portion of the buffer, the first symbols into the M2M data;
convert, based on contents stored at the second portion of the buffer, the second symbols into the UE data; and
forward the M2M data to a first device and forward the UE data to a second device that differs from the first device.

17. The non-transitory computer-readable medium of claim 16, wherein the one or more instructions, when causing the processor to convert the first symbols into the M2M data and the second symbols into the UE data, further cause the processor to:
shift one or more frequencies associated with the first signals without modifying frequencies associated with the second signals;
generate the first symbols based on the frequency shifted first signals; and
generate the second symbols based on the second signals.

18. The non-transitory computer-readable medium of claim 16, wherein the first band includes a first range of frequencies and a second range of frequencies that are separated by a third range of frequencies included in the second band.

* * * * *